United States Patent [19]

Rosenwald

[11] 3,838,992

[45] Oct. 1, 1974

[54] SYNERGISTIC ANTI-ICING COMPOSITION

[75] Inventor: Robert H. Rosenwald, Western Springs, Ill.

[73] Assignee: Universal Oil Products Company, Des Plaines, Ill.

[22] Filed: Mar. 2, 1973

[21] Appl. No.: 337,496

Related U.S. Application Data

[63] Continuation-in-part of Ser. No. 117,740, Feb. 22, 1971, abandoned.

[52] U.S. Cl.................. 44/72, 44/DIG. 1, 44/DIG. 4
[51] Int. Cl............................................... C10l 1/26
[58] Field of Search............................ 44/72, DIG. 1

[56] References Cited
UNITED STATES PATENTS

| | | | |
|---|---|---|---|
| 2,807,525 | 9/1957 | Forman | 44/DIG. 1 |
| 3,032,971 | 5/1962 | Shotton | 44/DIG. 1 |
| 3,436,195 | 4/1969 | Rosenwald et al | 44/72 |

Primary Examiner—Daniel E. Wyman
Assistant Examiner—Mrs. Y. H. Smith
Attorney, Agent, or Firm—James R. Hoatson, Jr.; Raymond H. Nelson; William H. Page, II

[57] ABSTRACT

A synergistic anti-icing composition comprising a mixture of (1) an alkyl acid phosphate salt of an N-alkyl-diaminoalkane and an alkyl acid phosphate salt of an alkyl-monoamine and (2) a polyhydroxy alcohol which is prepared by the alkylene oxide addition to a polyol.

8 Claims, No Drawings

3,838,992

SYNERGISTIC ANTI-ICING COMPOSITION

CROSS-REFERENCE TO RELATED APPLICATIONS

This application is a continuation-in-part of my copending Application Ser. No. 117,740 filed Feb. 22, 1971 now abandoned.

BACKGROUND OF THE INVENTION

U.S. Pat. No. 3,436,195 in the names of Robert H. Rosenwald and Wayne J. Faust describes a novel synergistic anti-icing composition for use in minimizing stalling of carbureted engines during periods of relatively high humidities and temperatures of from about 30° to about 60° F. This synergistic composition is a mixture of (1) alkyl acid phosphate salt of N-alkyl-diaminoalkane and alkyl acid phosphate salt of alkyl-monoamine and (2) polyhydroxy alcohol. The polyhydroxy alcohol described and claimed in the patent contains from about 2 to about 8 carbon atoms and from about 2 to 4 hydroxy groups.

However, this synergistic anti-icing composition has been found to be useful only in gasolines which possess a relatively high vapor pressure, but is not effective when utilized as an anti-icing composition in gasolines which possess a relatively low vapor pressure. For example, gasolines which may be referred to as winter grade gasolines possess a Reid vapor pressure in the range of from about 12 to about 13 pounds per square inch absolute at 100° F. while summer grade gasolines may be characterized by having a relatively low Reid vapor pressure in the range of from about 8 to about 10 pounds per square inch absolute at 100° F. As will be hereinafter shown in greater detail, it was totally unexpected that the novel synergistic anti-icing compositions of the present invention in which the polyhydroxy alcohol portion of the composition of matter is prepared by the alkylene oxide addition to a polyol and which will contain from about 10 to about 50 carbon atmos per molecule and from about 2 to about 10 hydroxy groups will result in a synergistic anti-icing composition which will effectively raise the stalling times of gasolines which possess a relatively low vapor pressure.

DESCRIPTION OF THE INVENTION

While the synergistic anti-icing composition described in U.S. Pat. No. 3,436,195 produces a synergistic effect, I have now found even a greater synergistic effect in gasolines which possess a relatively low vapor pressure is obtained when the polyhydroxy alcohol portion of the composition is prepared by the alkylene oxide addition to a polyol. The polyhydroxy alcohol derivative prepared in this manner contains more than 8 carbon atoms and preferably from about 10 to about 50 carbon atoms. As will be shown by the data in the examples appended to the present specifications, a strong synergistic effect was obtained with such a mixture in which the polyhydroxy alcohol contained an average of 36 carbon atoms.

In one aspect an embodiment of this invention relates to a synergistic anti-icing composition of (1) from about 5 percent to about 95 ercent by weight of (a) from about 5 percent to about 95 percent by weight of alkyl acid phosphate salt of N-alkyl-diaminoalkane in which the alkyl contains from 3 to about 30 carbon atoms and the alkane contains from 2 to about 12 carbon atoms and (b) from about 5 percent to about 95 percent by weight of the alkyl acid phosphate salt of alkyl-monoamine in which the alkyl contains from 3 to about 30 carbon atoms and (2) from about 95 percent to about 5 percent by weight of a polyhydroxy alcohol prepared by the alkylene oxide addition to a polyol.

In another embodiment the present invention relates to gasoline containing an anti-icing concentration of the synergistic composition herein set forth.

As hereinbefore set forth the present invention relates to a synergistic anti-icing combination comprising a mixture of a phosphate salt of an N-alkyl-diaminoalkane and a phosphate salt of an alkyl-monoamine in combination with a polyhydroxy alcohol prepared by the alkylene oxide addition to a polyol. The combination of these components in one composition of matter will exhibit a synergistic effect as relates to anti-icing characteristics when utilized in an effective amount in a gasoline which possesses relatively low vapor pressures, that is, a Reid vapor pressure, in the range of from about 8 to about 10 pounds per square inch absolute at 100° F. This characteristic was totally unexpected in view of the fact that an anti-icing combination comprising a phosphate salt of an N-aklyl-diaminoalkane and a phosphate salt of an alkyl-monoamine in combination with a polyhydroxy alcohol which contains from 2 to about 8 carbon atoms and from 2 to about 4 hydroxy groups does not exhibit any synergistic effect in increasing stalling time when applied to the same type of gasoline. This difference in synergistic effect will be hereinafter shown in greater detail in the examples which are set forth at the end of the specification.

One component of the synergistic combination of the present invention is a mixture of phosphate salts of N-alkyl-diaminoalkane and of an alkyl-monoamine. In a preferred embodiment, an alkyl acid phosphate, which may be the same or different, is used in preparing the diamine salt and the monoamine salt. The alkyl acid phosphate includes both the alkyl acid orthophosphates and the alkyl acid pyrophosphates. In the alkyl acid orthophosphates, the mono-alkyl ester, dialkyl ester or a mixture thereof may be employed. In the alkyl acid pyrophosphates, the monoalkyl ester, dialkyl ester, trialkyl ester or mixtures thereof may be employed, the dialkyl ester being preferred, and the ester groups may be attached to the same or different phosphorus atom. Generally, however, this compound will be symmetrical and, thus, the alkyl ester groups will be attached to different phosphorus atoms.

Illustrative examples of preferred alkyl acid orthophosphates and pyrophosphates are set forth below. In general, it is preferred that the alkyl moiety contains from about 3 to about 20 and more particularly from about 4 to about 15 carbon atoms each. Accordingly, particularly preferred alkyl acid orthophosphates include monobutyl acid orthophosphate, dibutyl acid orthophosphate, mixture of mono- and dibutyl acid orthophosphates, monopentyl acid orthophosphate, dipentyl acid orthophosphate, mixture of mono- and dipentyl acid orthophosphates, monohexyl acid orthophosphate, dihexyl acid orthophosphate, mixture of mono- and dihexyl acid orthophosphates, monoheptyl acid orthophosphate, diheptyl acid orthophosphate, mixture of mono- and diheptyl acid orthophosphates, monooctyl acid orthophosphate, dioctyl acid orthophosphate, mixture of mono- and dioctyl acid orthophosphates, monononyl acid orthophosphate, dinonyl acid orthophosphate, mixture of mono- and dinonyl acid orthophosphates, monodecyl acid orthophosphate, didecyl acid orthophosphate, mixture of mono- and didecyl acid orthophosphates, monoundecyl acid orthophosphate, diundecyl acid orthophosphate, mixture of mono- and diundecyl acid orthophosphates, monododecyl acid orthophosphate, didodecyl acid orthophosphate, mixture of mono- and didodecyl acid orthophosphates, monotridecyl acid orthophosphate, ditridecyl acid orthophosphate, mixture of mono- and ditridecyl acid orthophosphates, monotetradecyl acid orthophosphate, ditetradecyl acid orthophosphate, mixture of mono- and ditetradecyl acid orthophosphates, monopentadecyl acid orthophosphate, dipentadecyl acid orthophosphate, etc. It is understood that the alkyl moiety may be of straight or branched chain and that it may be of primary, secondary or tertiary configuration.

Preferred alkyl acid pyrophosphates include monobutyl acid pyrophosphate, dibutyl acid pyrophosphate, mixture of mono- and dibutyl acid pyrophosphates, monopentyl acid pyrophosphate, dipentyl acid pyrophosphate, mixture of mono- and dipentyl acid pyrophosphates, monohexyl acid pyrophosphate, dihexyl acid pyrophosphate, mixture of mono- and dihexyl acid pyrophosphates, monoheptyl acid pyrophosphate, diheptyl acid pyrophosphate, mixture of mono- and diheptyl acid pyrophosphates, monooctyl acid pyrophosphate, dioctyl acid pyrophosphate, mixture of mono- and dioctyl acid pyrophosphates, monononyl acid pyrophosphate, dinonyl acid pyrophosphate, mixture of mono- and dinonyl acid pyrophosphates, monodecyl acid pyrophosphate, didecyl acid pyrophosphate, mixture of mono- and didecyl acid pyrophosphates, monoundecyl acid pyrophosphate, diundecyl acid pyrophosphate, mixture of mono- and diundecyl acid pyrophosphates, monododecyl acid pyrophosphate, didodecyl acid pyrophosphate, mixture of mono- and didodecyl acid pyrophosphates, monotridecyl acid pyrophosphate, ditridecyl acid pyrophosphate, mixture of mono- and ditridecyl acid pyrophosphates, monotetradecyl acid pyrophosphate, ditetradecyl acid pyrophosphate, mixture of mono- and ditetradecyl acid pyrophosphates, monopentadecyl acid pyrophosphate, dipentadecyl acid pyrophosphate, mixture of mono- and dipentadecyl acid pyrophosphates, etc. Here again, it is understood that the alkyl moiety may be of straight or branched chain and may be of primary, secondary or tertiary configuration.

The specific phosphates hereinbefore set forth are preferred. It is understood that other suitable alkyl phosphates may be used in accordance with the present invention. For example, alkyl acid phosphates, including both the ortho- and pyrophosphates, are manufactured commercially as a mixture of mono- and dialkyl acid phosphates and are available commercially at a considerably lower cost. In many cases, such mixtures are very suitable for use in preparing the salts of the present invention and such use, therefore, is preferred for economic reasons.

While the alkyl acid phosphates are preferred, it is understood that other suitable phosphates may be employed but not necessarily with equivalent results. For example, in place of the alkyl moiety of the phosphate, an unsaturated aliphatic group may be employed, and thus may contain a double bond in the aliphatic chain. In still another embodiment the alkyl moiety or moieties may be replaced by cyclic derivatives including particularly cyclohexyl, but may comprise cyclobutyl, cyclopentyl, cycloheptyl, cyclooctyl, etc. It is understood that the aliphatic or cyclic groups may contain hydrocarbyl or non-hydrocarbyl substituents attached thereto, the last mentioned being selected from hydroxy, alkoxy, etc.

Other phosphates which may be used in preparing the salts are oxyalkylated hydroxy hydrocarbon phosphates in which the hydroxy hydrocarbon is phenol and preferably mono- or dialkyl phenols in which the alkyl contains from 1 to 20 carbon atoms each, or hydroxyalkanols containing from 6 to 40 and preferably 10 to 30 carbon atoms. The oxyalkylation may be effected to add from 1 to 50 oxyalkyl groups containing from 1 to 10 and preferably from 2 to 4 carbon atoms per oxyalkyl group. It is understood that a mixture of these phosphates may be employed.

Any suitable alkyl monoamine is used in preparing the phosphate salt for use as a component of the additive composition of the present invention. The alkyl monoamine may contain from about 3 to about 30 carbon atoms and preferably contains from about 4 to about 12 carbon atoms and thus preferred amines include butyl amine, pentyl amine, hexyl amine, heptyl amine, octyl amine, nonyl amine, decyl amine, undecyl amine, dodecyl amine, etc. It is understood that the alkyl moiety may be of straight or branched chain and may be of primary, secondary or tertiary configuration. A particularly preferred alkyl-monoamine for use in the present invention is 2-ethylhexyl amine. Other preferred alkyl-monoamines include those known as beta amines in which the alkyl group is attached to the nitrogen atom through the beta carbon of the alkyl group.

Any suitable diamine is used in preparing the phosphate salt for use as a component in the additive composition of the present invention. While the diamine may contain from 2 to about 50 carbon atoms, it preferably contains from about 8 to about 40 carbon atoms. Particularly preferred diamine is N-alkyl-diaminoalkane in which the alkyl moiety contains from about 3 to about 30 carbon atoms and more particularly from about 6 to about 20 carbon atoms and the alkane moiety contains from 2 to about 12 carbon atoms and preferably from about 3 to 6 carbon atoms. A particularly preferred N-alkyl-diaminoalkane is N-alkyl-1,3-diaminopropane, the alkyl group being derived from tallow. This compound is available commercially under the trade name of "Duomeen T." Other preferred N-alkyl-1,3-diaminopropanes comprise those in which the alkyl group is derived from lauric acid, coconut fatty acid, soya fatty acid, etc. These are available commercially at the present time and comprise mixed alkyl-substituted 1,3-diaminopropanes. For example, in the case of "Duomeen T" the alkyl groups contain from about 12 to about 20 carbon atoms per group and mostly contain 16 to 18 carbon atoms. However, when desired, the alkyl group of the N-alkyl-1,3-diaminopropane or other N-alkyl-diaminoalkanes may be prepared to contain any number of carbon atoms desired in the alkyl group and, thus, may be selected from hexyl, heptyl, octyl, nonyl, decyl, undecyl, dodecyl, tridecyl, tetradecyl, pentadecyl, hexadecyl, heptadecyl, octadecyl, nonadecyl, eicosyl, etc. It is understood that a mixture of diamines containing different alkyl groups may be employed and that the alkyl and alkane moieties may be of straight or branched chain. Furthermore, it is understood that the alkyl moiety may be of primary, secondary or tertiary configuration. Also, particularly preferred in this embodiment are the beta amines in which the alkyl group is attached to the nitrogen atom through the beta carbon atom of the alkyl group.

While the N-alkyl-1,3-diaminopropanes are preferred, it is understood that other suitable N-alkyl-diaminoalkanes may be employed. Illustrative examples include N-alkyl-1,2-diaminoethanes, N-alkyl-1,2-diaminopropanes, N-alkyl-1,2-diaminobutanes, N-alkyl-1,3-diaminobutanes, N-alkyl-1,4-diaminobutanes, N-alkyl-1,2-diaminopentanes, N-alkyl-1,3-diaminopentanes, N-alkyl-1,4-diaminopentanes, N-alkyl-1,5-diaminopentanes, N-alkyl-1,2-diaminohexanes, N-alkyl-1,3-diaminohexanes, N-alkyl-1,4-diaminohexanes, N-alkyl,1,5-diaminohexanes, N-alkyl-1,6-diaminohexanes, etc.

In another embodiment the alkyl-monoamine and/or alkyl-diaminoalkane may contain a double bond in the alkyl group. In still another embodiment the alkyl group may contain non-hydrocarbyl substitutions, the substitutions being selected from hydroxy, alkoxy, N-dihydrocarbylamide, halogen, particularly chlorine and fluorine, etc. In still another embodiment, in place of an aliphatic group, the amine may be a cyclic amine as, for example, cyclohexyl amine, dicyclohexyl amine and cyclohexyl-diaminoalkane or the cycloalkyl group may be cyclobutyl, cyclopentyl, cycloheptyl, cyclooctyl, etc. In still another embodiment the cyclic group may be a heterocyclic nitrogen compound including piperidyl, piperazyl, etc. It is understood that the different amines are not necessarily equivalent.

In general, the neutral salts of the phosphate and alkyl-mono-amine and of the phosphate and diamine are preferred. The neutral salts are prepared by utilizing stoichiometric amounts of the acid and the amine. In other words, the concentration of the alkyl acid phosphate and of the alkyl-monoamine or of the alkyl acid phosphate and of the diaminoalkane will be selected so that there will be an equivalent number of acid groups to amino groups. Thus, the specific concentrations will depend upon whether the orthophosphate or pyrophosphate or whether the monoalkyl phosphate or dialkyl phosphate is used. It also will depend upon whether the monoamine or diamine is employed. In another embodiment, the salt is a basic salt which is prepared by utilizing a deficiency of acid groups in relation to the amino groups. In still another embodiment, the acid salt is used, which is prepared by using an excess of acid groups with relation to the amine groups. From the above description it will be seen that a number of different salts may be used in accordance with the present invention. It is understood that these different salts are not necessarily equivalent in the same or different fuels but all of them will serve to give improved results in most, if not all, fuels.

The salts are prepared in any suitable manner and, in general, are prepared by admixing the phosphate and the alkyl-monoamine and/or diaminoalkane in the appropriate proportions at ambient temperature, preferably with vigorous stirring. When desired, the phosphate salt of the monoamine and the phosphate salt of the diamine may be separately prepared and utilized as such or subsequently mixed to prepare a blended composition. In another embodiment the mixture of salts may be prepared simultaneously by reacting the alkyl phosphate or phosphates with both the monoamine and diamine in the required proportions to form the mixture of salts in one step.

The salts are readily prepared at room temperature, although slightly elevated temperature, which generally will not exceed about 200° F., may be employed when desired. Excessive temperatures should be avoided in order to prevent the undesired formation of reaction products resulting in the liberation of water and in the formation of phosphor amidic acid derivatives or other undesired reaction products. When desired, it may be of advantage to utilize a solvent, either in forming a more fluid mixture of the phosphates and/or amines before mixing or during the mixing thereof. In some cases it is desirable to admix the salt or salts with a solvent in order to form a more fluid final product. Any suitable solvent may be used and generally will comprise an organic compound and more particularly a hydrocarbon distillate. Particularly preferred solvents are aromatic hydrocarbons including benzene, toluene, xylene, ethylbenzene, cumene, etc., or mixtures thereof, or paraffinic hydrocarbons including pentane, hexane, heptane, octane, nonane, decane, etc., or mixtures thereof, or mixtures of the aromatic and paraffinic hydrocarbons, including naphtha, gasoline, etc.

As hereinbefore set forth, the phosphate salt of monoamine and the phosphate salt of diamine may be prepared separately or in admixture. When prepared separately, the salts may be blended or the salts may be added separately to the substrate. The different salts will be used in any suitable proportion, which may range from 5 percent to 95 percent of one salt and 5 percent to 95 percent by weight of the other salt. In some cases it is preferred that the phosphate salt of the diamine is used in a larger proportion and, in such cases, the salt of the diamine is used in a concentration of from about 60 percent to about 90 percent by weight and the phosphate salt of the mono-amine is used in a concentration of from 10 percent to about 40 percent by weight, exclusive of solvent. When a solvent is employed, a stock solution may be prepared to contain the active ingredients in a concentration of from about 10 percent to a saturated solution which will be above about 50 percent by weight of active ingredients.

The phosphate salts, whether prepared separately or simultaneously, are blended with a polyhydroxy alcohol prepared via alkylene oxide addition to a polyol. The alkylene oxide comprises ethylene oxide and preferably propylene oxide, although it may comprise butylene oxide, amylene oxide, hexylene oxide, etc. The polyol may comprise ethylene glycol, propylene glycol, butylene glycol, amylene glycol, hexylene glycol, etc., trimethylene glycol, tetramethylene glycol, pentamethylene glycol, hexamethylene glycol, etc. Triols include pentane triol, hexane triol, heptane triol, octane triol, etc. Other polyols may contain from 4 to 10 hydroxyl groups and thus will include the carbohydrates, including particularly sorbitol. Other polyols may be the trimethanol alkanes such as trimethanolpropane.

A number of the polyhydroxy alcohols prepared via alkylene oxide addition are avialable commercially. One of these is a polyoxypropylene polyol available commercially as "NIAX LHT-240" and is prepared by the reaction of a hexane triol with propylene oxide. Analysis shows the product to have a hydroxyl number of 234.6, which corresponds to about 10 moles of propylene oxide per mole of hexane triol. Accordingly, this polyhydroxy alcohol contains an average of 36 carbon atoms and 3 hydroxyl groups per molecule. Another such product is available commercially as "NIAX LHT-550" and is believed to be the mixed polyol resulting from the propylene oxide addition to a mixture of a hexane triol and sorbitol. This polyhydroxy alcohol is said to have a hydroxyl number of about 550, and an acid number of 0.2 maximum and a specific gravity 20/20 of 1.0910.

While the polyhydroxy alcohols prepared via alkylene oxide addition conveniently are obtained commercially, when desired these may be prepared in any suitable manner. In general, a polyhydroxy hydrocarbon is reacted with an alkylene oxide, including particularly ethylene oxide and propylene oxide, in mole ratios to produce the oxyalkylated polyhydroxy hydrocarbon containing the number of oxyalkyl groups desired. These may range from 1 to 20 and preferably from 5 to 15. The oxyalkylation is effected in any suitable manner and generally is conducted at a temperature of from about room temperature to about 350° F. and preferably from about 200° F. to about 300° F., preferably in the presence of a catalyst such as sodium hydroxide, potassium hydroxide, tertiary amine, quaternary hydroxide, etc. When the oxyalkylation is to be limited to the addition of one oxyalkyl group, the catalyst may be omitted and the reaction is effected in the presence of water. Superatmospheric pressure may be employed, which may range from 10 to 1,000 pounds or more.

As hereinbefore set forth, the polyhydroxy alcohol for use in the present invention preferably contains from about 10 to about 50 carbon atoms and from 2 to about 10 hydroxyl groups, although it may contain a higher number of carbon atoms, generally not in excess of about 100 carbon atoms, if advantages appear therefor.

The mixture of phosphate-amine salts and polyhydroxy alcohol will be used in any suitable proportion, which may range from about 5 percent to about 95 percent and preferably from 10 percent to 90 percent by weight of the mixed phosphate-amine salts and from about 95 percent to about 5 percent and preferably from 90 percent to 10 percent by weight of the polyhydroxy alcohol.

The amount of total additive composition to be added to the gasoline will be sufficient to effect improved de-icing. For economic reasons, the concentration should be as low as practicable and may range from 0.0001 percent to 0.05 percent by weight and preferably is within the range of from about 0.002 percent to about 0.01 percent by weight of the fuel, based on the mixed phosphate-amine salts and polyhydroxy alcohol exclusive of solvent when employed. While each of the phosphate-amine salts and the polyhydroxy alcohol may be added separately to the fuel, or the mixed phosphate-amine salts and the polyhydroxy alcohol added separately to the fuel, it generally is preferred to prepare a composition of the phosphate-amine salts and polyhydroxy alcohol in the proper concentrations and to add this composition to the fuel in the desired amount. When desired, the mixture of amine salts and polyhydroxy alcohol may be prepared as a solution in a suitable solvent, such as a paraffinic, aromatic and/or naphthenic naphtha or gasoline. When desired, the solvent may comprise an aromatic or paraffinic hydrocarbon and will be selected from those hereinbefore set forth. In such a solution, the phosphate-amine salts and the polyhydroxy alcohol will comprise from about 10 percent to about 90 percent and preferably from about 25 percent to about 75 percent of the solution.

The novel additive mixture of the present invention also serves as a corrosion inhibitor, antioxidant synergist, tetraalkyl lead stabilizer and pre-ignition suppressor. However, when desired, the composition of the present invention may be used along with additional antioxidant, metal deactivator, detergent, dye or other additives incorporated in gasoline for specific purposes. When desired, one or more of these additional additives may be admixed with the composition of the present invention and marketed and used in this manner.

The following examples are introduced to illustrate further the novelty and utility of the present invention but not with the intention of unduly limiting the same.

EXAMPLE I

The phosphate-amine salts of this example comprise 50 percent by weight of the mixed mono- and ditridecyl acid orthophosphate salts of N-tallow-1,3-diaminopropane and 50 percent by weight of the mixed mono- and ditridecyl acid orthophosphate salts of 2-ethylhexyl amine. These salts were prepared by intimately mixing the phosphate and amines to form the salts and then blending with naphtha solvent to form a final solution containing the active ingredients in a concentration of 50 percent by weight.

A synergistic mixture was prepared to contain the salts formed in the above manner and NIAX LHT-240. As hereinbefore set forth, the polyhydroxy alcohol is the propylene oxide addition product to a hexane triol.

The anti-icing properties were determined in a carburetor icing demonstrating apparatus consisting of a vacuum pump equipped so that cool moisture-saturated air from an ice tower is drawn through a gasoline carburetor. The gasoline sample passes from a fuel reservoir through a flow meter into the carburetor at a rate of 14.4 lb./hr. The air from the ice tower is passed at a flow rate of 14.4 lb./hr. at a temperature of 40° F. The manifold vacuum is 9.5 In. Hg. at the start and 12.5 In. Hg. at the end of the test. Evaporation of the gasoline in the carburetor further cools the cold moist air, with resulting ice formation on the throttle plate. The time in seconds is measured until a drop of 3 In. Hg. vacuum occurs, which indicates stalling conditions.

The fuel which was used in this example is a commercial gasoline which, without an anti-icing additive, reached stalling conditions within about 15 seconds. This gasoline is known as summer grade gasoline and possesses a Reid vapor pressure in the range of from 8 to about 10 pounds per square inch absolute. This is in contrast to gasoline which is known as winter grade gasoline possessing a vapor pressure of from 12 to 13 pounds per square inch absolute and which will normally reach stalling conditions in about 8 seconds.

When the mixture of phosphate-amine salts described above were used in concentrations of 25, 50 and 100 ppm (parts per million) of the 50% solution (12.5, 25 and 50 ppm active ingredient, respectively), the stalling times were 19.3, 25.4 and 34.6 seconds respectively.

When the NIAX LHT-240 was used by itself in concentrations of 25, 50 and 100 ppm (all being on 100 percent active ingredient basis) the stalling times were 15.6, 17.8 and 18.4 seconds, respectively.

In contrast to the above, a mixture of the 50 percent solution of the mixed phosphate-amine salts and 50 percent of NIAX LHT-240 gave stalling times of 51.8 and 139.3 seconds at concentrations of 50 and 100 ppm, respectively.

When using 25 ppm each of the mixed phosphate-amine salt solution and NIAX LHT-240, the expected stalling conditions would be the sum of 19.3 and 15.6 seconds or a total of 34.9 seconds. In contrast, when using 50 ppm of the synergistic mixture the stalling conditions were 51.8 seconds. Similarly, when using 50 ppm each of the phosphate-amine salt solution and NIAX LHT-240, the expected stalling conditions would be 25.4 seconds plus 17.8 seconds or a total of 43.2 seconds. In contrast, the stalling time when using 100 ppm of the synergistic mixture was 139.3 seconds, which is an increase of over three times the expected stalling conditions. Actually the increase obtained by using the synergistic mixture is even greater when based on the results obtained less the stalling time of the gasoline not containing an anit-icing additive. When compared in this manner, the stalling time at 100 ppm concentration of a synergistic mixture would be 124 seconds, in comparison with the expected stalling time of 10.4 seconds plus 2.8 seconds or a total of 13.2 seconds. Regardless of how the synergism is expressed, it is apparent that a very high degree of synergism was obtained by using the mixture of phosphate-amine salts and NIAX LHT-240.

In contrast to the results which are reached when using a combination of a 50 percent solution of the mixed phosphate salts and 50 percent of the propylene oxide addition product to a hexane triol, the same test was run using the gasoline having a vapor pressure in the range of 8 to 10 pounds per square inch absolute in which the anti-icing composition was a combination of the mixed phosphate-smine salts diluted with hexylene glycol so that the mixture contained a 50 percent solution of the mixed phosphate-amine salts and 50 percent hexylene glycol. The anti-icing composition was used in concentrations of 25, 50 and 100 parts per million by way of the gasoline. It was determined that the stalling times for the three concentrations of the combination of mixed phosphate-amine salts and hexylene glycol were 20.0, 24.1 and 28.6 seconds respectively.

It is therefore readily apparent that a totally unexpected synergistic result was obtained when using a combination of the mixed phosphate-amine salts and the propylene oxide addition product to a hexane triol, as compared to the results which were obtained when utilizing an anti-icing composition comprising a combination of the mixed phosphate-amine salts and hexylene glycol, the former showing an icing time twice as long as the latter used in a concentration of 50 parts per million and over five times longer when used in a concentration of 100 parts per million.

EXAMPLE II

The phosphate-amine salts of this example comprise 75 percent by weight of the mixed mono- and diisooctyl acid orthophosphate salts of N-tallow-1,3-diaminopropane and 25 percent by weight of the mixed mono- and ditridecyl acid orthophosphate salts of 2-ethylhexyl amine. These salts are each separately prepared by intimately mixing the phosphates and amines in proportions to form the neutral salts and then blending with xylene solvent to form a final solution containing the active ingredients in a concentration of 50 percent by weight.

The polyhydroxy alcohol in this example comprises NIAX LHT-550 which, as hereinbefore set forth, is the propylene oxide addition product to a mixture of hexane triol and sorbitol.

A synergistic mixture is prepared to comprise 70 percent by weight of the phosphate-amine salt solution and 30 percent by weight of NIAX LHT-550. The synergistic mixture is added to gasoline and serves to increase the time before stalling occurs.

EXAMPLE III

The anti-icing composition of this example is a blend of (1) 60 percent by weight of (a) 40 percent of the mono- and diisoamyl acid orthophosphate salts of N-soya-1,2-diaminoethane and (b) 60 percent by weight of the mono- and diisohexyl acid orthophosphate salts of decylamine with (2) 40 percent by weight of the ethylene oxide addition product to ethylene glycol containing an average of 6 oxyethylene groups per mole of ethylene glycol. The amine phosphate salts are prepared as a 40 percent solution in a naphtha solvent and then blended with the ethylene oxide addition product in proportions set forth above. This synergistic mixture is incorporated in gasoline in a concentration of 80 ppm and serves to improve the anti-stalling property of the gasoline.

EXAMPLE IV

The anti-icing composition of this example is a mixture of 50 percent by weight of a mixture of 35 percent by weight of the diamyl acid orthophosphate salt of N-oleyl-1,3-diaminopropane and 65 percent by weight of the diamyl acid orthophosphate salt of oleylamine, and 50 percent by weight of the propylene oxide addition product to propylene glycol. The addition product contains an average of 12 moles of propylene oxide per mole of propylene glycol. The mixture is prepared as a 50 percent weight solution in toluene solvent and is incorporated in a concentration of 50 ppm into commercial gasoline. This serves to increase the time before stalling of the engine occurs.

I claim as my invention:

1. A synergistic anti-icing composition of (1) from about 5 percent to about 95 percent by weight of (a) from about 5 to about 95 percent by weight of an alkyl acid phosphate salt of an N-alkyl-diaminoalkane in which the alkyl contains from 3 to about 30 carbon atoms and the alkane contains from 2 to about 12 carbon atoms and (b) from about 5 percent to about 95 percent by weight of an alkyl acid phosphate salt of an alkyl-monoamine in which the alkyl contains from 3 to about 30 carbon atoms and (2) from about 95 percent to about 5 percent by weight of a polyhydroxy alcohol prepared by the alkylene oxide addition to a polyol, said polyhydroxy alcohol containing from 10 to about 50 carbon atoms and from about 2 to about 10 hydroxy groups.

2. The composition of claim 1 in which the polyhydroxy alcohol is the propylene oxide addition product to a hexane triol and contains an average of 36 carbon atoms per molecule.

3. The composition of claim 1 in which the polyhydroxy alcohol is the propylene oxide addition product to propylene glycol.

4. The composition of claim 1 in which said phosphate salt of the N-alkyl-diaminoalkane is a mixture of mono-and ditridecyl acid orthophosphate salts of N-tallow-1,3-diaminopropane.

5. The composition of claim 1 in which said phosphate salt of the N-alkyl-diaminoalkane is a mixture of mono- and diisoamyl acid orthophosphate salts of N-soya-1,2-diaminoethane.

6. The composition of claim 1 in which said phosphate salt of the N-alkyl-diaminoalkane is a mixture of mono- and diisooctyl acid orthophosphate salts of N-tallow-1,3-diaminopropane.

7. The composition of claim 1 in which said phosphate salt of the alkyl-monoamine is a mixture of mono- and ditridecyl acid orthophosphate salts of 2-ethylhexylamine.

8. The composition of claim 1 in which said phosphate salt of the alkyl-monoamine is a mixture of mono- and diisohexyl acid orthophosphate salts of decylamine.

* * * * *